US011608774B2

(12) United States Patent
Injac et al.

(10) Patent No.: US 11,608,774 B2
(45) Date of Patent: Mar. 21, 2023

(54) VALVE ARRANGEMENT FOR MULTI-FLOW TURBINE

(71) Applicant: BorgWarner Inc., Auburn Hills, MI (US)

(72) Inventors: Ivan Injac, Albisheim (DE); Ahmet Coksen, Schwäbisch Hall (DE)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 17/358,139

(22) Filed: Jun. 25, 2021

(65) Prior Publication Data
US 2022/0195885 A1    Jun. 23, 2022

(30) Foreign Application Priority Data

Dec. 22, 2020 (DE) .......................... 102020134770.7

(51) Int. Cl.
*F02B 37/18* (2006.01)
*F16K 1/44* (2006.01)
(Continued)

(52) U.S. Cl.
CPC .......... *F02B 37/183* (2013.01); *F02B 37/025* (2013.01); *F16K 1/44* (2013.01);
(Continued)

(58) Field of Classification Search
CPC ... F01D 17/12; F05D 2220/40; F05D 2260/60
See application file for complete search history.

(56) References Cited

U.S. PATENT DOCUMENTS 8,984,880 B2 * 3/2015 Marques ............... F01D 17/105
60/602
9,556,786 B2 * 1/2017 Marques ............... F16K 1/2014
(Continued)

FOREIGN PATENT DOCUMENTS

DE    102015008358 A1    1/2016
DE    102015011544 A1    3/2017
(Continued)

OTHER PUBLICATIONS

Machine-assisted English language abstract and machine-assisted English language translation for DE 10 2015 008 358 A1 extracted from espacenet.com database on Aug. 23, 3021, 15 pages.
(Continued)

*Primary Examiner* — Jesse S Bogue
(74) *Attorney, Agent, or Firm* — Howard & Howard Attorneys PLLC

(57) ABSTRACT

The present invention relates to a valve arrangement (100) for a multi-channel turbine (10), having a housing section (300) with a first volute (320), with a second volute (340) and with a connecting region (360) between the first volute (320) and the second volute (340), and having a valve body (110) for closing off the connecting region (360) in a closed position of the valve body (110). A wall region (370) of the housing section (300), which wall region is arranged in the connecting region (360) and is situated opposite the valve body (110) in the closed position, is configured to be optimized in terms of flow to increase, during operation of the valve arrangement (100), a rate of flow transfer of exhaust gas between the first volute (320) and the second volute (340) in an open position of the valve body (110).

18 Claims, 6 Drawing Sheets

(51) Int. Cl.
*F02B 37/02* (2006.01)
*F01D 17/10* (2006.01)

(52) U.S. Cl.
CPC ........ *F01D 17/105* (2013.01); *F05D 2220/40* (2013.01); *F05D 2260/60* (2013.01)

(56) References Cited

U.S. PATENT DOCUMENTS

| | | | |
|---|---|---|---|
| 11,028,765 B2* | 6/2021 | Cola | F16K 11/161 |
| 2009/0028694 A1* | 1/2009 | Naemura | F02B 39/00 |
| | | | 60/602 |
| 2014/0174077 A1* | 6/2014 | Palaniyappan | F01D 17/08 |
| | | | 60/602 |
| 2016/0053676 A1* | 2/2016 | Ge | F02B 37/168 |
| | | | 60/602 |
| 2020/0063649 A1* | 2/2020 | Marsal | F16J 15/0812 |
| 2020/0240322 A1 | 7/2020 | Brinkert et al. | |
| 2020/0263598 A1* | 8/2020 | Cola | F16K 11/161 |
| 2020/0263599 A1* | 8/2020 | Cola | F02B 37/22 |
| 2020/0318531 A1* | 10/2020 | Sparrer | F02B 37/186 |

FOREIGN PATENT DOCUMENTS

| | | |
|---|---|---|
| DE | 102018108617 A1 | 6/2018 |
| DE | 102017009452 A1 | 4/2019 |
| GB | 2557491 B | 10/2019 |

OTHER PUBLICATIONS

Machine-assisted English language abstract for DE 10 2015 011 544 A1 extracted from espacenet.com database on Aug. 23, 2021, 4 pages.

Machine-assisted English language abstract for DE 10 2017 009 452 A1 extracted from espacenet.com database on Aug. 23, 2021, 4 pages.

Machine-assisted English language abstract and machine-assisted English language translation for DE 10 2018 108 617 A1 extracted from espacenet.com database on Aug. 23, 3021, 13 pages.

* cited by examiner

VALVE ARRANGEMENT FOR MULTI-FLOW TURBINE

CROSS-REFERENCE TO RELATED APPLICATIONS

The present application claims priority to and all the benefits of German Patent Application No. 102020134770.7, filed Dec. 22, 2020, the disclosure of which is expressly hereby incorporated herein by reference in its entirety.

TECHNICAL FIELD

The present invention relates to a valve arrangement for a multi-channel turbine. The present invention also relates to a multi-channel turbine with a corresponding valve arrangement.

BACKGROUND

Ever-increasing numbers of vehicles of the newer generation are being equipped with supercharging devices in order to achieve the required aims and satisfy legal regulations. In the development of supercharging devices, it is the aim to optimize the individual components and the system as a whole with regard to their reliability and efficiency.

Known supercharging devices, for example exhaust-gas turbochargers, have a turbine with a turbine wheel, which is driven by the exhaust-gas stream of the internal combustion engine. A compressor with a compressor wheel which is arranged with the turbine wheel on a common shaft compresses the fresh air which is drawn in for the engine. In this way, the air or oxygen quantity that is available to the engine for combustion is increased. This in turn leads to an increase in performance of the internal combustion engine. Multi-channel turbines, which are used for example for six-cylinder engines, are in particular also known in the prior art.

A disadvantage of known multi-channel turbines, for example dual-volute turbines or twin-scroll turbines, is that, in particular operating states, for example at and above a certain rotational speed, the separation into two volutes has a negative effect on the performance of the turbocharger. To remedy this problem, it is known from the prior art to provide flow transfer regions in which the exhaust-gases can flow from one volute over into the other volute and in the opposite direction. It is also known to open and to close said flow transfer regions in a variable manner via adjustment devices with a corresponding valve arrangement. Furthermore, it is known to combine said flow transfer regions with a bypass opening. This yields the possibility of the bypass opening and the flow transfer regions being controlled by the same valve arrangement. The flow transfer between the two volutes is often still not sufficiently controllable in such systems, and the volumetric flow rate (rate of flow transfer) is limited. One reason for this is that the cast turbine housings have (relatively) sharp edges along the side wall (separating wall) between the turbine volutes. These lead, in particular in the range between LET (low-end torque) and rated power, in which the valve is opened and flow transfer (no or only little outflow into the wastegate) is desired, to flow separation and thus to a reduction in the effective volute connection cross section.

It is an object of the present invention to provide a valve arrangement for a multi-channel turbine and also a corresponding multi-channel turbine with an optimized valve arrangement, in particular for improving the flow transfer function.

SUMMARY OF THE INVENTION

The present invention relates to a valve arrangement for a multi-channel turbine as claimed in claim 1, to a multi-channel turbine as claimed in claim 14, and to a supercharging device as claimed in claim 15.

The valve arrangement according to the invention for a multi-channel turbine comprises a housing section with a first volute, with a second volute and with a connecting region between the first volute and the second volute, and comprises a valve body for closing off the connecting region in a closed position of the valve body. A wall region of the housing section, which wall region is arranged in the connecting region and is situated opposite the valve body in the closed position, is configured to be optimized in terms of flow to increase, during operation of the valve arrangement, a rate of flow transfer of exhaust gas between the first volute and the second volute in an open position of the valve body.

The configuration according to the invention of the valve arrangement makes possible the avoidance of flow separation during the flow of exhaust gases from one volute over into the other volute. In this way, the flow of the exhaust gas between the volutes can be optimized. Optimization of the flow between the volutes or the resulting greater effective volute connection cross section (higher rate of flow transfer with otherwise identical boundary conditions) yields a number of advantages. Firstly, the difference in pressure between the loaded volute and the unloaded volute becomes less. Moreover, it is consequently possible to reduce the (static) pressure in the in each case loaded volute and, overall, upstream of the turbine wheel. Furthermore, the optimization in terms of flow also makes it possible to achieve better controllability of the exhaust-gas streams between the volutes (and into an optional wastegate opening). This applies in particular to the operating range between LET (low-end torque) and rated power, whereby ultimately the specific fuel consumption of a vehicle can be reduced too. As a result of the invention, the valve arrangement can be made smaller to realize the same effective volute connection cross section as hitherto. As a consequence, a smaller turbine wheel with lower mass inertia can be used, which has a positive influence on the response behavior of a corresponding supercharging device and of the internal combustion engine coupled thereto. Alternatively, a greater effective volute connection cross section with corresponding advantages can be achieved without enlargement of the valve arrangement and in particular of the connecting region (and consequently of the valve body).

In configurations which are combinable with the configuration above, the wall region may be formed to be at least partially rounded in order to increase the rate of flow transfer. As a result of the rounded shape of the wall region, flow separation is avoided, this leading to the advantages mentioned above.

In configurations which are combinable with any of the configurations above, the housing section may have a separating wall between the first volute and the second volute, and the connecting region may be in the form of a cutout in the separating wall. The wall region may be a section of the separating wall and have an outer contour. A first cross-sectional plane E1 may be spanned by a length direction of the separating wall and a height direction of the separating wall, a second cross-sectional plane E2 may be spanned by a thickness direction of the separating wall and the height direction, and a third cross-sectional plane E3 may be spanned by the thickness direction and the length direction.

In configurations, in a thickness direction of the separating wall, the outer contour may be formed to be at least partially rounded. In particular, in the first cross-sectional plane E1, the outer contour may follow substantially a shape of the valve body or be complementary with respect to said shape.

In configurations which are combinable with the configurations above, in the second cross-sectional plane E2 and/or the third cross-sectional plane E3, the outer contour may be formed to be at least partially circular with a constant radius R1. The radius R1 may in this case lie in the range from 2 mm to 100 mm, in particular lie in the range from 5 mm to 80 mm. Alternatively, in the second cross-sectional plane E2 and/or the third cross-sectional plane E3, the outer contour may be formed to be at least partially rounded with a variable radius R1. The radius R1 may in this case vary in the range from 2 mm to 100 mm, in particular vary in the range from 5 mm to 80 mm. In a further alternative, in the second cross-sectional plane E2 and/or the third cross-sectional plane E3, the outer contour may have two straight sections in the height direction and a transition section situated therebetween, wherein the transition section is situated opposite the valve body in the closed position. The straight sections may in this case be formed to be substantially parallel to one another and preferably run in the height direction. Alternatively, the straight sections may run obliquely toward one another in the direction of the transition section.

In configurations which are combinable with the configurations above, the transition section may be described continuously via a constant or via a variable radius R1. In particular, the radius R1 may lie or vary in the range from 2 mm to 100 mm, preferably lie or vary in the range from 5 mm to 80 mm. Alternatively, the transition section may have first and second rounded transition regions and a straight bridge section situated therebetween. Here, the first and second rounded transition regions may be defined via first and second transition radii R2, R3. In particular, the first and second transition radii R2, R3 may be of equal or different size and have a constant size. Alternatively, the transition radii R2, R3 may be configured to vary in an identical or different manner along the first and second rounded transition regions. In particular, the transition radii R2, R3 may lie or vary in the range from 2 mm to 100 mm, preferably lie or vary in the range from 5 mm to 80 mm.

In configurations which are combinable with any of the configurations above, in the second cross-sectional plane E2 and/or the third cross-sectional plane E3, the outer contour may have at least one undercut.

In configurations which are combinable with any of the configurations above, an extent of the wall region in the height direction directly below the base section of the valve body, viewed in the closed position, may lie in the range from 1 mm to 30 mm, in particular lie in the range from 5 mm to 25 mm, particularly preferably lie in the range from 10 mm to 20 mm. Alternatively, an extent of the wall region in the height direction directly below the base section of the valve body, viewed in the closed position, may approach zero or be zero. In this way, the flow transfer of the exhaust gas can be optimized further, since flow separation can be substantially avoided in this region.

In configurations which are combinable with any of the configurations above, a separating wall thickness d of the separating wall in the wall region may lie in the range from 2 mm to 40 mm, in particular lie in the range from 4 mm to 30 mm, particularly preferably lie in the range from 6 mm to 20 mm.

In configurations which are combinable with any of the configurations above, the valve body may be arranged rotatably in the housing section and be designed to be moved between the closed position and the open position.

In configurations which are combinable with any of the configurations above, the valve arrangement may moreover comprise an inner lever which is coupled to the valve body in order to pivot the valve body between the closed position and the open position. The valve arrangement may moreover comprise a shaft for rotatable mounting of the valve body in the housing section, and an outer lever for actuating the valve arrangement.

In configurations which are combinable with any of the configurations above, the housing section may have a bypass opening, and the valve arrangement may moreover be designed for regulation of the bypass opening. The valve body may then be designed to close off, in the closed position, both the bypass opening and the connecting region. Moreover, a valve seat which surrounds the bypass opening may be provided. The valve body may have a closing collar, which, in the closed position, is in engagement with the valve seat, in order to close off the bypass opening. The valve seat and the closing collar may for example be of annular form.

In configurations which are combinable with the configurations above, the valve body may be configured in such a way that, with an adjustment of the valve body from the closed position into the open position, firstly only the connecting region, for flow transfer of exhaust gases between the first volute and the second volute, is opened up continuously, and from a particular degree of opening of the valve body, additionally the bypass opening is opened continuously.

The invention moreover comprises a multi-channel turbine for a supercharging device, which has a turbine wheel, has a turbine housing and has a valve arrangement according to any of the configurations above, wherein the housing section is formed as part of the turbine housing.

The invention furthermore comprises a supercharging device for an internal combustion engine, which has a compressor and an above-described multi-channel turbine, wherein the multi-channel turbine is coupled rotatably to the compressor.

Further details and features of the invention will be described on the basis of the following figures.

DETAILED DESCRIPTION

Exemplary embodiments for the valve arrangement 100 according to the invention, for the turbine 10 according to the invention and for the supercharging device according to the invention will be described below on the basis of the figures.

Firstly, general features of the invention will be described on the basis of FIGS. 1a to 1c and FIG. 2. Then, some exemplary embodiments will be discussed in more detail on the basis of FIGS. 3 to 7.

Figure 1A:
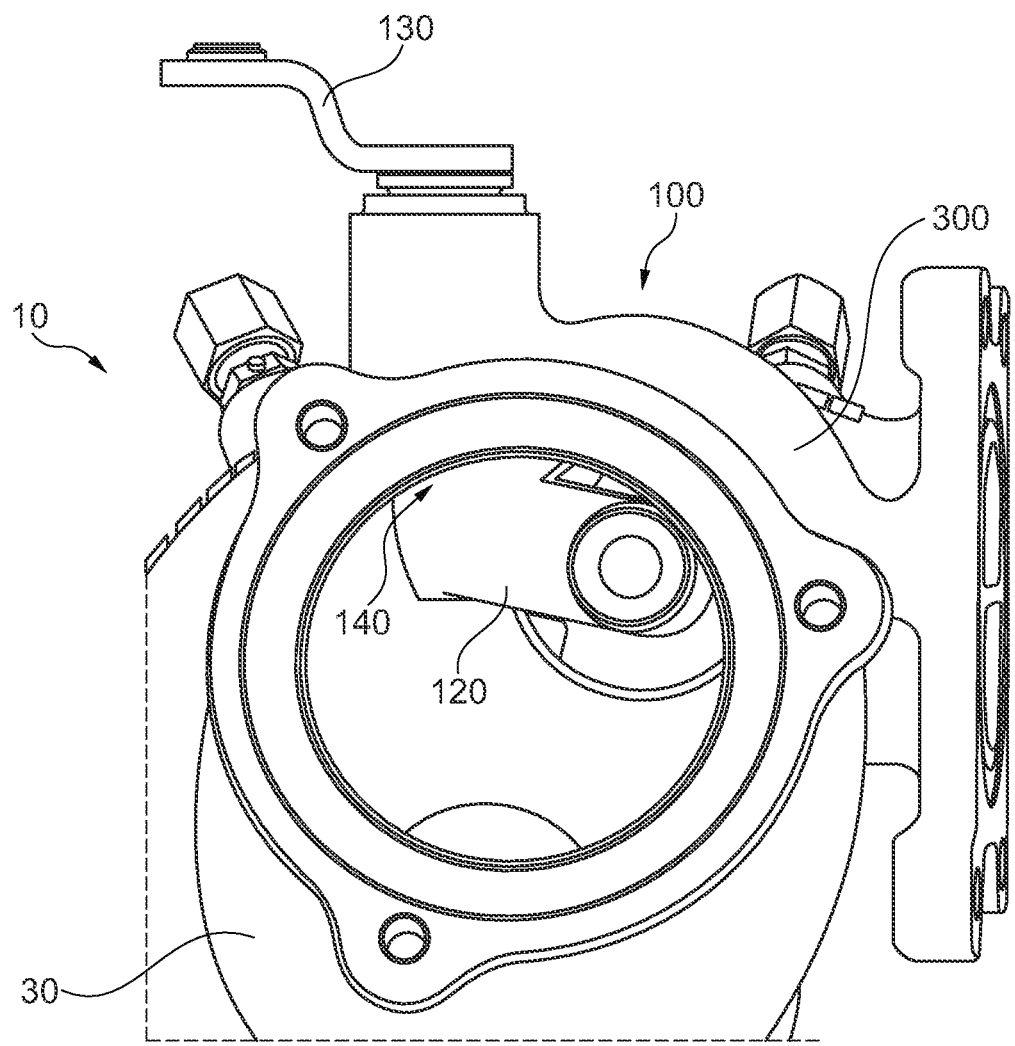
FIG. 1a shows a view of an embodiment of the valve arrangement according to the invention.
Figure 1B:
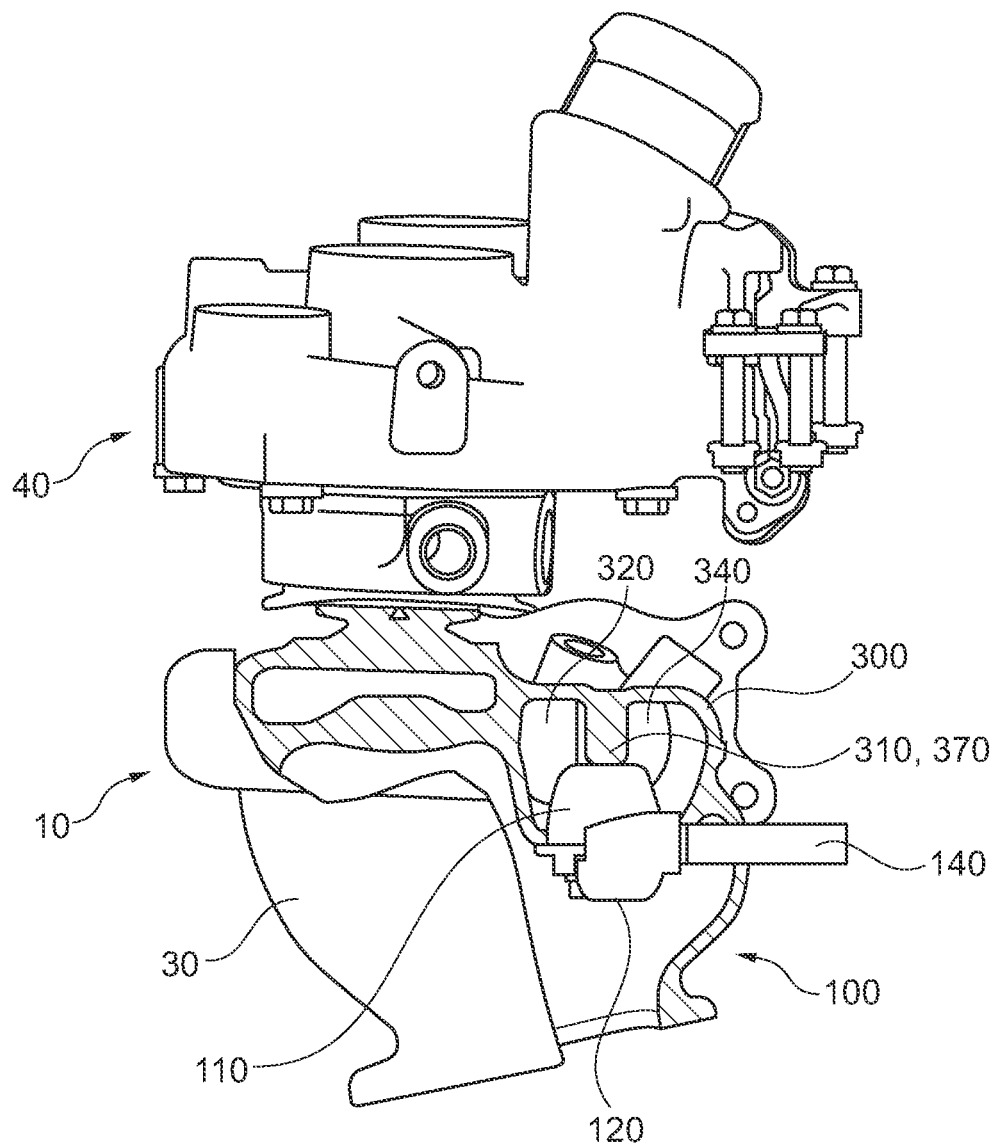
FIG. 1b shows a view of an embodiment of the valve arrangement according to the invention and of the turbine according to the invention and of the supercharging device according to the invention in partial section.
Figure 1C:
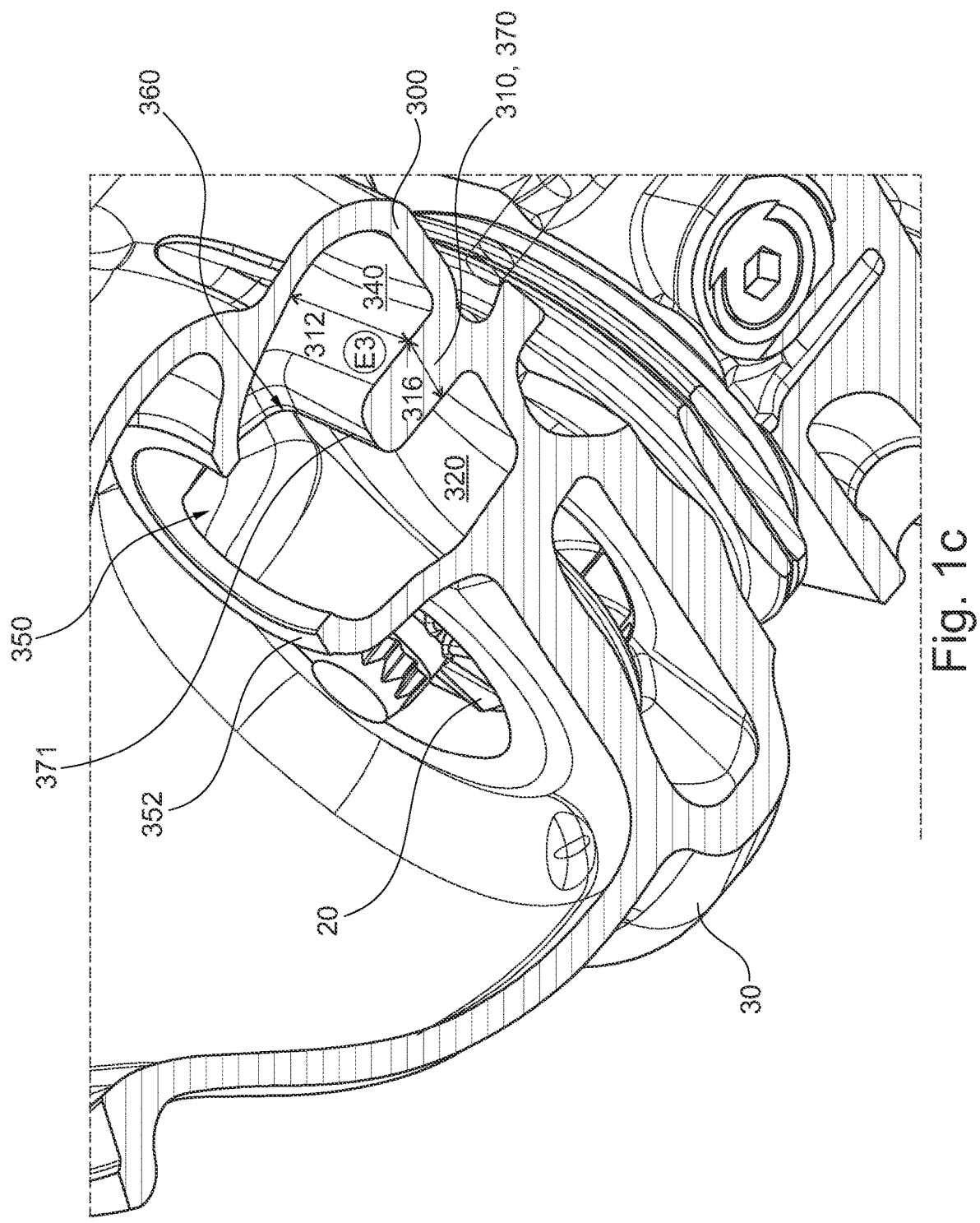
FIG. 1c shows an isometric sectional view of an embodiment of the valve arrangement according to the invention and of the turbine according to the invention.
Figure 2:
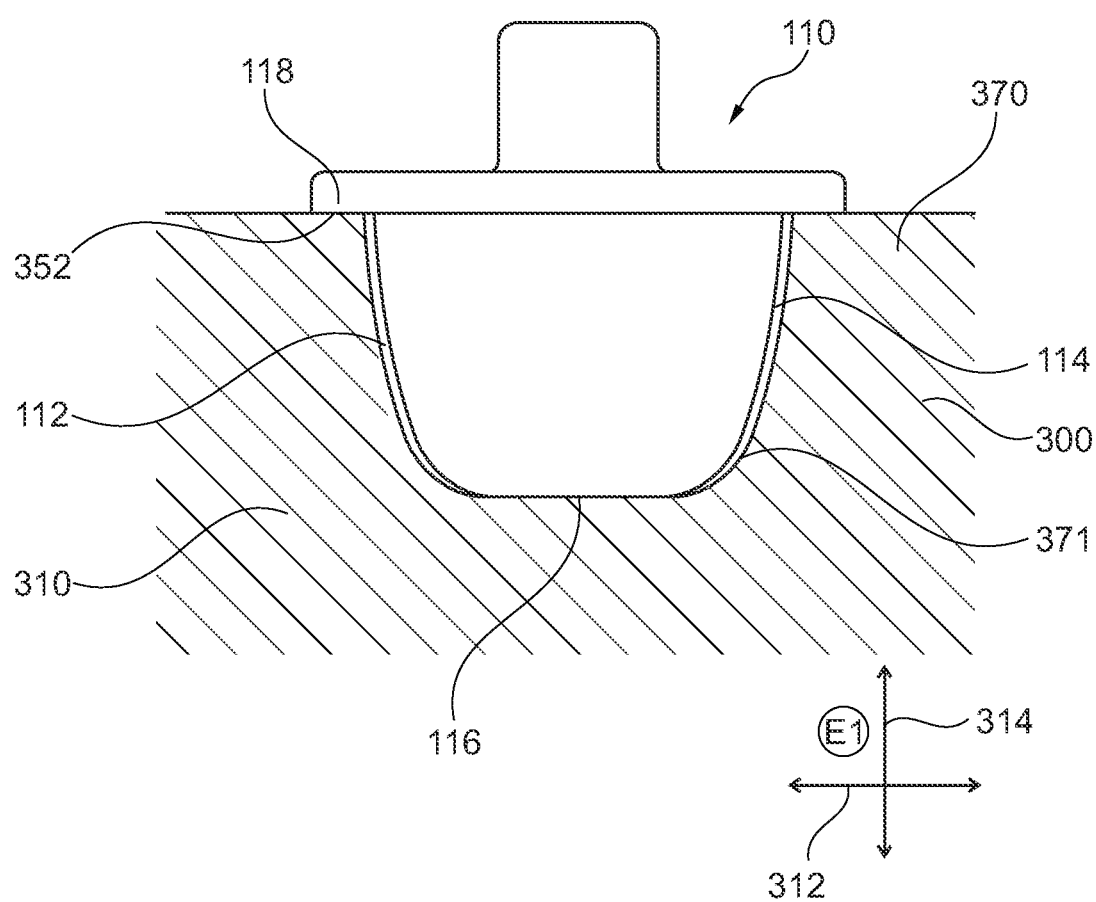
FIG. 2 shows a longitudinal section (cross-sectional plane E1) through an embodiment of the valve arrangement according to the invention.

FIGS. 1a to 1c show, in three different views, the valve arrangement 100 according to the invention combined with a multi-channel turbine 10 according to the invention of a supercharging device according to the invention, for example an exhaust-gas turbocharger. The supercharging device has the turbine 10 and a compressor 40 which is coupled rotatably to the turbine 10 so as to be driven by the exhaust gases flowing through the turbine 10. The turbine 10 has a turbine housing 30 with a first volute 320 and with a second volute 340. FIG. 1c also illustrates a turbine wheel 20, which is arranged in the turbine housing 30.

The valve arrangement 100 according to the invention comprises a housing section 300 of the turbine housing 30 that has (a part of) the first volute 320, has (a part of) the second volute 340 and has a connecting region 360 between the first volute 320 and the second volute 340 (see FIGS. 1b and 1c). The two volutes 320, 340 are separated from one another by means of a separating wall 310. Furthermore, provision is made of a valve body 110 which serves for closing off the connecting region 360 in a closed position of the valve body 110. A wall region 370 (of the separating wall 310) of the housing section 300, which wall region is arranged in the connecting region 360 and is situated opposite the valve body 110 in the closed position, is configured to be optimized in terms of flow according to the invention. This leads, during operation of the valve arrangement 100, to an increase in the rate of flow transfer of exhaust gas between the first volute 320 and the second volute 340 in an open position of the valve body 110. Here, the rate of flow transfer refers to an exhaust-gas volume which flows from one volute 320, 340 over into the other volute 320, 340 per unit time.

The configuration according to the invention of the valve arrangement 100 makes possible the avoidance of flow separation during the flow of exhaust gases from one volute 320, 340 over into the other volute 320, 340. In this way, the flow of the exhaust gas between the volutes 320, 340 can be optimized. Optimization of the flow between the volutes 320, 340 or the resulting greater effective volute connection cross section (higher rate of flow transfer with otherwise identical boundary conditions) yields a number of advantages. Firstly, the difference in pressure between the loaded volute 320, 340 and the unloaded volute 320, 340 becomes less. Moreover, it is consequently possible to reduce the (static) pressure in the in each case loaded volute 320, 340 and, overall, upstream of the turbine wheel 20. Furthermore, the optimization in terms of flow also makes it possible to achieve better controllability of the exhaust-gas streams between the volutes 320, 340 (and into an optional wastegate opening 350—see further below). This applies in particular to the operating range between LET (low-end torque) and rated power, whereby ultimately the specific fuel consumption of a correspondingly equipped vehicle can be reduced too.

As a result of the invention, the valve arrangement 100 can be made smaller to realize the same effective volute connection cross section as hitherto. As a consequence, a smaller turbine wheel 20 with lower mass inertia can be used, which has a positive influence on the response behavior of a corresponding supercharging device and of the internal combustion engine coupled thereto. Overall, this leads to improved efficiency of the turbine stage, both at part load and at full load. For example, the efficiency of the turbine stage at full load can be increased by 4-5%, and the difference in pressure between the two volutes 320, 340 with an open position of the valve body 110 (for example 50% or more of the maximum possible opening) can be reduced to 150 mbar. Alternatively, a greater effective volute connection cross section with corresponding advantages can be achieved without enlargement of the valve arrangement 100 and in particular of the connecting region 360 (and consequently of the valve body 110).

The valve body 110 is arranged rotatably in the housing section 300 and is designed to be moved between the closed position and the open position. The valve body 110 can, for example, be brought from the closed position into multiple fixedly defined open positions. It is also possible that the valve body 110 can be adjusted continuously from the closed position into an open end position. The valve arrangement 100 moreover has an inner lever 120 which is coupled to the valve body 110 in order to pivot the valve body 110 between the closed position and the open position (see for example FIG. 1a). The valve arrangement moreover comprises a shaft 140 (see FIG. 1b) for rotatable mounting of the valve body 110 in the housing section 300, and an outer lever 130 for actuating the valve arrangement 100.

As shown in FIGS. 1b and 1c, the wall region 370 is preferably formed to be at least partially rounded so as to increase the rate of flow transfer. As a result of the rounded shape of the wall region 370, flow separation is avoided, this leading to the advantages mentioned above. It is possible for example for the complete wall region 370, which defines the connecting region 360, to be configured to be correspondingly optimized (rounded). Alternatively, it is also possible for only particular sub-regions to be configured in a corresponding manner. Such sub-regions may for example be regions which are closer to the shaft 140, via which shaft the valve body 110 is mounted rotatably in the housing 30 (see FIG. 1b), or which are further away from the shaft 140. Additionally or alternatively, parts of the wall region 370 that are situated opposite a base section 116 of the valve body 110 (see FIG. 2), may be configured to be correspondingly optimized (rounded). Here, the exact configuration of the wall region 370 optimized in terms of flow or the definition of which regions are configured in a corresponding manner may be optimized in an application-specific manner (for example on the basis of the size and/or the area of use of a corresponding supercharging device).

As already mentioned, the turbine housing 30 or the housing section 300 has a separating wall 310 between the first volute 320 and the second volute 340. Here, the connecting region 360 is in the form of a cutout or recess in the separating wall 310. The wall region 370 has in this region an outer contour 371 (see for example FIG. 1c).

For the purpose of providing a better description of the formation options according to the invention of the outer contour 371 of the wall region 370 along the connecting region 360, some cross-sectional planes and directions are defined in the following text. A first cross-sectional plane E1 (see FIG. 2) is spanned by a length direction 312 of the separating wall 310 and a height direction 314 of the separating wall 310. A second cross-sectional plane E2 (see FIG. 3) is spanned by a thickness direction 316 of the separating wall 310 and the height direction 314. A third cross-sectional plane E3 (see FIG. 1c) is spanned by the thickness direction 316 and the length direction 312. Here, the length direction 312 of the separating wall 310 extends substantially parallel to the two volutes 320, 340. The directions perpendicular to the length direction 312 may be referred to as the height direction 314 of the separating wall 310 and as the thickness direction 316 of the separating wall 310 (see FIGS. 2 and 3). The length direction 312 and the height direction 314 span the first cross-sectional plane E1, in which the separating wall 310 extends. It goes without saying that said plane may be defined only sectionally, because the separating wall 310 has a three-dimensional, spiral-shaped profile along the two volutes 320, 340. Extending perpendicularly to this cross-sectional plane E1 is the thickness direction 316 of the separating wall 310, along which the separating wall thickness d (see FIG. 3) can be measured. The second cross-sectional plane E2 (through the wall region 370) is spanned by the thickness direction 316 and the height direction 314 (see FIG. 3). The third cross-sectional plane E3 (through the wall region 370) is spanned by the thickness direction 316 and the length direction 312 (see FIG. 1c).

As shown by nearly all the figures, the outer contour 371 is formed to be at least partially rounded in a thickness direction 316 of the separating wall 310. Moreover, in the first cross-sectional plane E1, the outer contour 371 follows substantially a shape of the valve body 110 or is complementary with respect to said shape (see FIG. 2). Thus, the shape of the valve body 110 is matched to the shape (outer contour 371) of the wall region 370. As seen in the cross-sectional plane E1, along the wall region 370 of the separating wall 310, the valve body 110 has two side sections 112, 114 and the base section 116 situated therebetween (see FIG. 2). In the connecting region 360, the wall region 370 has corresponding sections which are situated opposite the valve body 110 in the closed position. Consequently, the wall region 370 has a shape complementary with respect to the valve body 110 for closing off the connecting region 360 in the closed position of the valve body 110.

Figure 3:
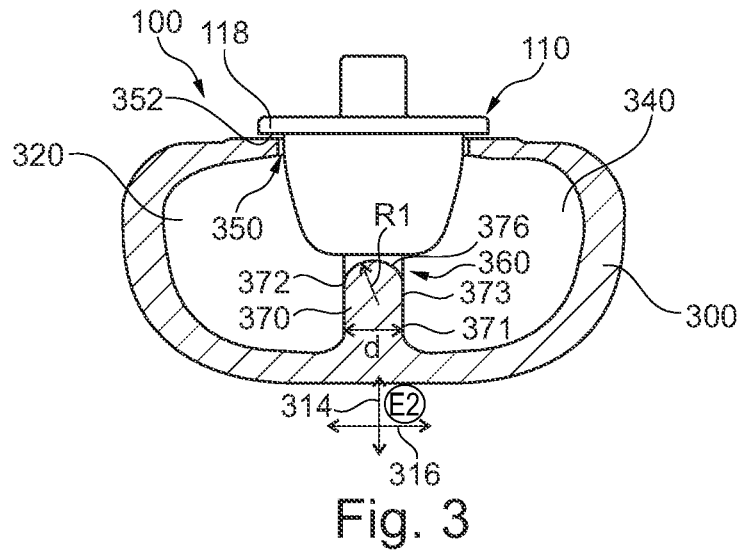
FIG. 3 shows a cross section (cross-sectional plane E2) of an embodiment of the valve arrangement according to the invention.
Figure 7:
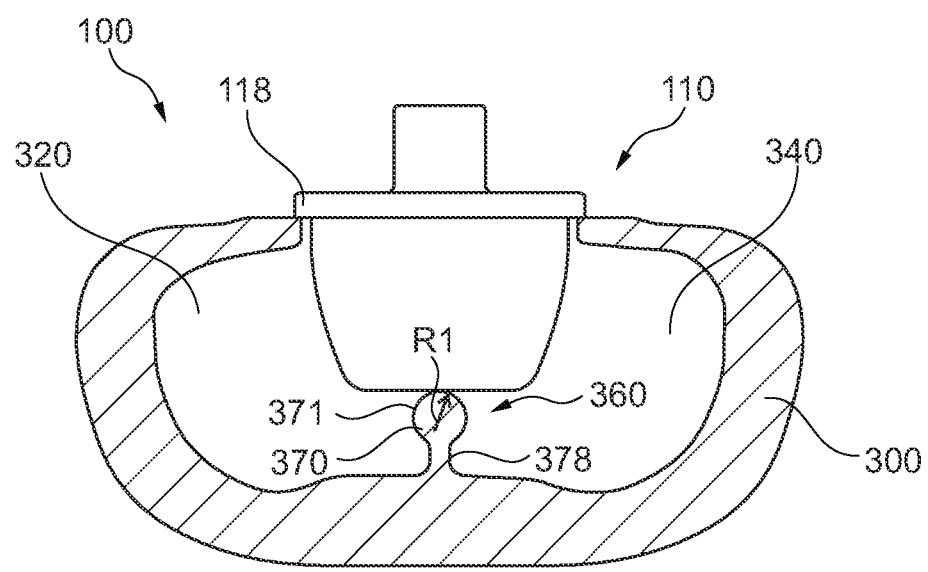
FIG. 7 shows a cross section (cross-sectional plane E2) of a further embodiment of the valve arrangement according to the invention.

Different possible configurations for the outer contour 371 will now be described in the following text. As shown for example in FIG. 3, as seen in the second cross-sectional plane E2, but as seen also in a continuous manner or alternatively in the third cross-sectional plane E3, the outer contour 371 may be formed to be at least partially circular with a constant radius R1. The radius R1 may in this case lie in the range from 2 mm to 100 mm, in particular lie in the range from 5 mm to 80 mm. The circular shape may for example extend over 180°, as shown in FIG. 3. In alternative configurations, the circular shape may extend over a range between 20° and 340°, in particular extend over a range between 50° and 300°. FIG. 7 shows for example an extent of the circular shape over approximately 320°.

Alternatively, as seen in the second cross-sectional plane E2, and as seen in a continuous manner or alternatively in the third cross-sectional plane E3, the outer contour 371 may be formed to be at least partially rounded with a variable radius R1. The radius R1 may in this case vary in the range from 2 mm to 100 mm, in particular vary in the range from 5 mm to 80 mm.

Figure 4:
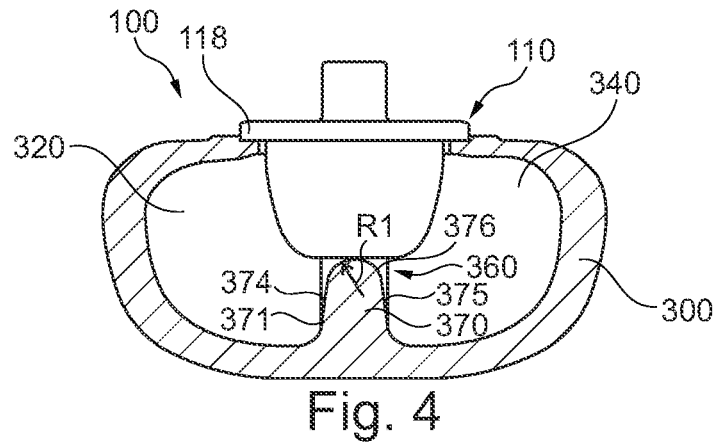
FIG. 4 shows a cross section (cross-sectional plane E2) of a further embodiment of the valve arrangement according to the invention.
Figure 5:
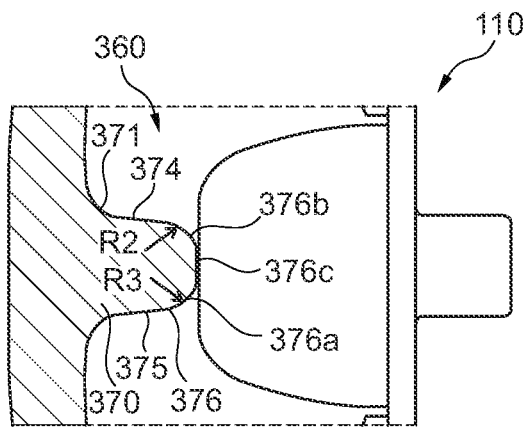
FIG. 5 shows an enlarged cross section (cross-sectional plane E2) of a further embodiment of the valve arrangement according to the invention.
Figure 6:
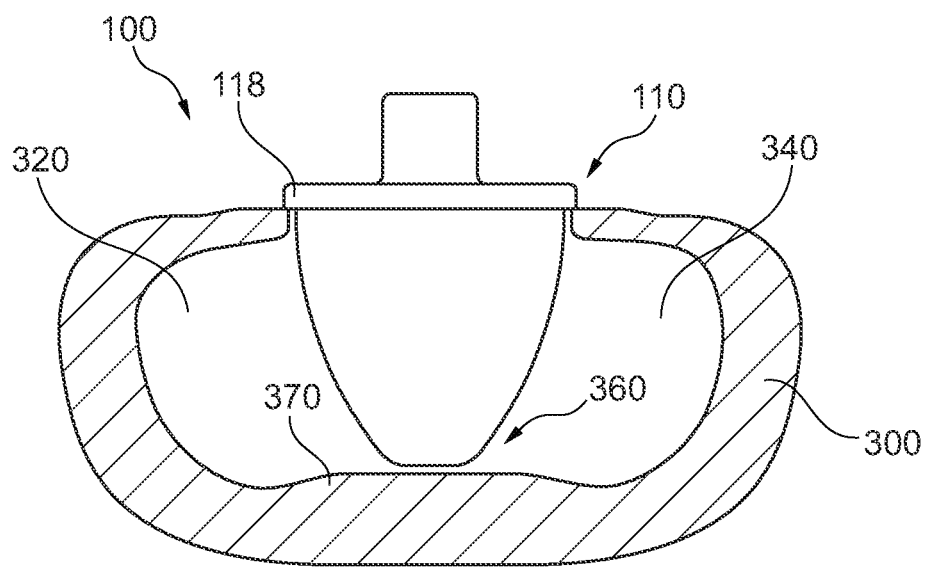
FIG. 6 shows a cross section (cross-sectional plane E2) of a further embodiment of the valve arrangement according to the invention.

In a further alternative, as seen in the second cross-sectional plane E2, and as seen in a continuous manner or alternatively in the third cross-sectional plane E3, the outer contour 371 may have two straight sections 372, 373; 374, 375 in the height direction 314 and a transition section 276 situated therebetween (see FIGS. 3 to 5). Here, the transition section 376 is situated opposite the valve body 110 in the closed position. As shown in the example in FIG. 3, the straight sections 372, 373 may in this case be formed to be substantially parallel to one another and run in the height direction 314. Alternatives to these are shown in FIGS. 4 and 5, in which the straight sections 374, 375 run obliquely toward one another in the direction of the transition section 376. In other words: the wall region 370 narrows in the direction of the transition section 376. Such a narrowing shape can also be achieved with the above-described variable radius along the outer contour 371.

Here, the transition section 376 may be described continuously via a constant or via a variable radius R1, as shown for example in FIGS. 3 and 4. In configurations, the radius R1 may lie or vary in the range from 2 mm to 100 mm, preferably lie or vary in the range from 5 mm to 80 mm.

In the alternative illustrated in FIG. 5, the transition section 376 has first and second rounded transition regions 376a, 376b and a straight bridge section 376c situated therebetween. The first and second rounded transition regions 376a, 376b are defined via first and second transition radii R2, R3. Here, the first and second transition radii R2, R3 may be of equal or different size and have a constant size. Alternatively, the transition radii R2, R3 may be configured to vary in an identical or different manner along the first and second rounded transition regions 376a, 376b. In particular, the transition radii R2, R3 may lie or vary in the range from 2 mm to 100 mm, preferably lie or vary in the range from 5 mm to 80 mm.

In the exemplary embodiment in FIG. 7, in the second cross-sectional plane E2, optionally also or alternatively in the third cross-sectional plane E3, the outer contour 371 has at least one undercut 378. The undercut 378 or undercuts 378 may be formed on one or both sides of the separating wall 310 or of the wall region 370 (undercuts 378 on both sides are shown in the exemplary embodiment in FIG. 7). Undercuts may also be provided in all the other embodiments described above. The undercut(s) 378 may lead to further optimization in terms of flow and reduce so-called dead-water zones.

For all the hitherto described embodiments, it goes without saying that the outer contour 371 has transitions between sections that, seen geometrically, lie completely in the second cross-sectional plane E2 and completely in the third cross-sectional plane E3. Such transitions lie in "transitions planes" arranged between these regions. For a person skilled in the art, it goes without saying that the outer contour of the wall region 370 in said transitions, according to the invention, can be or is configured analogously to the outer contour 371 in the adjoining sections of the wall region 370 and/or in the form of a smooth transition between the outer contour 371 of the adjoining sections.

Further optimization with regard to the behavior of the flow transfer between the two volutes 320, 340 can be achieved by way of the formation of the extent of the wall region 370 in the height direction 314. The extent of the wall region 370 in the height direction 314 directly below the base section 116 of the valve body 110, viewed in the closed position, may for example lie in the range from 1 mm to 30 mm, in particular lie in the range from 5 mm to 25 mm, particularly preferably lie in the range from 10 mm to 20 mm. Alternatively, an extent of the wall region 370 in the height direction 314 directly below the base section 116 of the valve body 110, viewed in the closed position, may approach zero or be zero (see FIG. 6). In this way, the flow transfer of exhaust gas can be optimized further, since flow separation can be substantially avoided by way of these measures in this region.

As already described further above, the separating wall 310 has a separating wall thickness d (see FIG. 3). In the wall region 370, the separating wall thickness d may lie in the range from 2 mm to 40 mm, in particular lie in the range from 4 mm to 30 mm, particularly preferably lie in the range from 6 mm to 20 mm.

As illustrated clearly in particular in FIG. 1c, the housing section 300 has a bypass opening 350. Moreover, a valve seat 352 which surrounds the bypass opening 350 is provided. Beside the regulation of the flow transfer, the valve arrangement 100 is also designed to regulate opening and closing of the bypass opening 350. Here, the valve body 110 is designed in such a way that, in the closed position, it closes off both the bypass opening 350 and the connecting region 360. For the closure of the bypass opening 350, the valve body 110 has a closing collar 118 (see for example FIG. 2), which, in the closed position, is in engagement with the valve seat 352. The valve seat 352 and the closing collar 118 may for example be of annular form.

In embodiments, the valve body 110 may then be configured in such a way that, with an adjustment of the valve body 110 from the closed position into the open position, firstly only the connecting region 360, for flow transfer of exhaust gases between the first volute 320 and the second volute 340, is opened up continuously, and from a particular degree of opening of the valve body 110, additionally the bypass opening 350 is opened continuously. In this way, it is possible to optimize the regulation of the transfer of flow through the connecting region 360 and of the opening/closing of the bypass opening 350 according to operating state of the turbocharger or of the engine connected thereto.

The invention moreover comprises a multi-channel turbine 10 for a supercharging device, which has a turbine wheel 20, a turbine housing 30 and an embodiment of the valve arrangement 100 according to the invention.

The invention furthermore comprises a supercharging device for an internal combustion engine, which has a compressor 40 and the above-described multi-channel turbine 10, wherein the multi-channel turbine 10 is coupled rotatably to the compressor 40.

Although the present invention has been described above and defined in the appended claims, it should be understood that the invention may alternatively also be defined in accordance with the following embodiments:

1. A valve arrangement (100) for a multi-channel turbine (10), comprising:
  a housing section (300) with a first volute (320), with a second volute (340) and with a connecting region (360) between the first volute (320) and the second volute (340);
  a valve body (110) for closing off the connecting region (360) in a closed position of the valve body (110);
  wherein a wall region (370) of the housing section (300), which wall region is arranged in the connecting region (360) and is situated opposite the valve body (110) in the closed position, is configured to be optimized in terms of flow to increase, during operation of the valve arrangement (100), a rate of flow transfer of exhaust gas between the first volute (320) and the second volute (340) in an open position of the valve body (110).

2. The valve arrangement according to embodiment 1, wherein the wall region (370) is formed to be at least partially rounded in order to increase the rate of flow transfer.

3. The valve arrangement according to embodiment 1 or embodiment 2, wherein the housing section (300) has a separating wall (310) between the first volute (320) and the second volute (340), and the connecting region (360) is in the form of a cutout in the separating wall (310).

4. The valve arrangement according to embodiment 3, wherein the wall region (370) is a section of the separating wall (310) and has an outer contour (371).

5. The valve arrangement according to embodiment 4, wherein a first cross-sectional plane (E1) is spanned by a length direction (312) of the separating wall (310) and a height direction (314) of the separating wall (310), a second cross-sectional plane (E2) is spanned by a thickness direction (316) of the separating wall (310) and the height direction (314), and a third cross-sectional plane (E3) is spanned by the thickness direction (316) and the length direction (312).

6. The valve arrangement according to embodiment 5, wherein, in a thickness direction (316) of the separating wall (310), the outer contour (371) is formed to be at least partially rounded.

7. The valve arrangement according to embodiment 5 or embodiment 6, wherein, in the first cross-sectional plane (E1), the outer contour (371) follows substantially a shape of the valve body (110) or is complementary with respect to said shape.

8. The valve arrangement according to any of embodiments 5 to 7, wherein, in the second cross-sectional plane (E2) and/or the third cross-sectional plane (E3), the outer contour (371) is formed to be at least partially circular with a constant radius (R1), in particular wherein the radius (R1) lies in the range from 2 mm to 100 mm, in particular lies in the range from 5 mm to 80 mm.

9. The valve arrangement according to any of embodiments 5 to 7, wherein, in the second cross-sectional plane (E2) and/or the third cross-sectional plane (E3), the outer contour (371) is formed to be at least partially rounded with a variable radius (R1), in particular wherein the radius (R1) varies in the range from 2 mm to 100 mm, in particular varies in the range from 5 mm to 80 mm.

10. The valve arrangement according to any of embodiments 5 to 7, wherein, in the second cross-sectional plane (E2) and/or the third cross-sectional plane (E3), the outer contour (371) has two straight sections (372, 373; 374, 375) in the height direction (314) and a transition section (376) situated therebetween, wherein the transition section (376) is situated opposite the valve body (110) in the closed position.

11. The valve arrangement according to embodiment 10, wherein the straight sections (372, 373) are formed to be substantially parallel to one another and preferably run in the height direction (314).

12. The valve arrangement according to embodiment 10, wherein the straight sections (374, 375) run obliquely toward one another in the direction of the transition section (376).

13. The valve arrangement according to any of embodiments 10 to 12, wherein the transition section (376) is described continuously via a constant or via a variable radius (R1), in particular wherein the radius (R1) lies or varies in the range from 2 mm to 100 mm, in particular lies or varies in the range from 5 mm to 80 mm.

14. The valve arrangement according to any of embodiments 10 to 12, wherein the transition section (376) has first and second rounded transition regions (376a, 376b) and a straight bridge section (376c) situated therebetween.

15. The valve arrangement according to embodiment 14, wherein the first and second rounded transition regions (376a, 376b) are defined via first and second transition radii (R2, R3), in particular wherein the first and second transition radii (R2, R3) are of equal size or different size and have a constant size, or wherein the transition radii (R2, R3) are configured to vary in an identical or different manner along the first and second rounded transition regions (376a, 376b).

16. The valve arrangement according to embodiment 15, wherein the transition radii (R2, R3) lie or vary in the range from 2 mm to 100 mm, in particular lie or vary in the range from 5 mm to 80 mm.

17. The valve arrangement according to any of embodiments 5 to 16, wherein, in the second cross-sectional plane (E2) and/or the third cross-sectional plane (E3), the outer contour has at least one undercut (378).

18. The valve arrangement according to any of embodiments 5 to 17, wherein an extent of the wall region (370) in the height direction (314) directly below the base section (116) of the valve body (110), viewed in the closed position, lies in the range from 1 mm to 30 mm, in particular lies in the range from 5 mm to 25 mm, particularly preferably lies in the range from 10 mm to 20 mm.

19. The valve arrangement according to any of embodiments 5 to 17, wherein an extent of the wall region (370) in the height direction (314) directly below the base section (116) of the valve body (110), viewed in the closed position, approaches zero or is zero.

20. The valve arrangement according to any of embodiments 3 to 17, wherein a separating wall thickness (d) of the separating wall (310) in the wall region (370) lies in the range from 2 mm to 40 mm, in particular lies in the range from 4 mm to 30 mm, particularly preferably lies in the range from 6 mm to 20 mm.

21. The valve arrangement according to any of the preceding embodiments, wherein the valve body (110) is arranged rotatably in the housing section (300) and is designed to be moved between the closed position and the open position.

22. The valve arrangement according to any of the preceding embodiments, moreover comprising an inner lever (120) which is coupled to the valve body (110) in order to pivot the valve body (110) between the closed position and the open position.

23. The valve arrangement according to embodiment 22, moreover comprising a shaft (140) for rotatable mounting of the valve body (110) in the housing section (300), and an outer lever (130) for actuating the valve arrangement (100).

24. The valve arrangement according to any of the preceding embodiments, wherein the housing section (300) has a bypass opening (350), and the valve arrangement (100) is moreover designed for regulation of the bypass opening (350).

25. The valve arrangement according to embodiment 24, wherein the valve body (110) is designed to close off, in the closed position, both the bypass opening (350) and the connecting region (360).

26. The valve arrangement according to embodiment 24 or embodiment 25, wherein a valve seat (352) surrounds the bypass opening (350), and the valve body (110) has a closing collar (118), which, in the closed position, is in engagement with the valve seat (352), in order to close off the bypass opening (350).

27. The valve arrangement according to embodiment 26, wherein the valve seat (352) and the closing collar (118) are of annular form.

28. The valve arrangement according to any of the embodiments 24 to 27, wherein the valve body (110) is configured in such a way that, with an adjustment of the valve body (110) from the closed position into the open position, firstly only the connecting region (360), for flow transfer of exhaust gases between the first volute (320) and the second volute (340), is opened up continuously, and from a particular degree of opening of the valve body (110), additionally the bypass opening (350) is opened continuously.

29. A multi-channel turbine (10) for a supercharging device, comprising:
 a turbine wheel (20); and
 a turbine housing (30);
 characterized by a valve arrangement (100) according to any of the preceding embodiments, wherein the housing section (300) is formed as part of the turbine housing (30).

30. A supercharging device for an internal combustion engine, comprising: a compressor (40) and a multi-channel turbine (10) according to embodiment 29, wherein the multi-channel turbine (10) is coupled rotatably to the compressor (40).

What is claimed is:

1. A valve arrangement (100) for a multi-channel turbine (10), comprising:
 a housing section (300) with a first volute (320), with a second volute (340) and with a connecting region (360) between the first volute (320) and the second volute (340);
 a valve body (110) for closing off the connecting region (360) in a closed position of the valve body (110);
 wherein a wall region (370) of the housing section (300) is arranged in the connecting region (360) and is situated opposite the valve body (110) in the closed position, wherein a shape of the wall region (370) is configured to be optimized in terms of flow to increase, during operation of the valve arrangement (100), a rate of flow transfer of exhaust gas between the first volute (320) and the second volute (340) in an open position of the valve body (110), wherein the housing section (300) has a bypass opening (350), and the valve arrangement (100) is designed for regulation of the bypass opening (350), and wherein the valve body (110) is configured in such a way that, with an adjustment of the valve body (110) from the closed position into the open position, firstly only the connecting region (360), for flow transfer of exhaust gases between the first volute (320) and the second volute (340), is opened up continuously, and from a particular degree of opening of the valve body (110), additionally the bypass opening (350) is opened continuously.

2. The valve arrangement as claimed in claim 1, wherein the wall region (370) is formed to be at least partially rounded in order to increase the rate of flow transfer.

3. The valve arrangement as claimed in claim 1, wherein the housing section (300) has a separating wall (310) between the first volute (320) and the second volute (340), and the connecting region (360) is in the form of a cutout in the separating wall (310), and wherein the wall region (370) is a section of the separating wall (310) and has an outer contour (371).

4. The valve arrangement as claimed in claim 3, wherein a first cross-sectional plane (E1) is spanned by a length direction (312) of the separating wall (310) and a height direction (314) of the separating wall (310), a second cross-sectional plane (E2) is spanned by a thickness direction (316) of the separating wall (310) and the height direction (314), and a third cross-sectional plane (E3) is spanned by the thickness direction (316) and the length direction (312).

5. The valve arrangement as claimed in claim 4, wherein, in the second cross-sectional plane (E2) and/or the third cross-sectional plane (E3), the outer contour (371) is formed to be at least partially circular with a constant radius (R1).

6. The valve arrangement as claimed in claim 5, wherein the radius (R1) lies in the range from 2 mm to 100 mm.

7. The valve arrangement as claimed in claim 4, wherein, in the second cross-sectional plane (E2) and/or the third cross-sectional plane (E3), the outer contour (371) is formed to be at least partially rounded with a variable radius (R1), in particular wherein the radius (R1) varies in the range from 2 mm to 100 mm, in particular varies in the range from 5 mm to 80 mm.

8. The valve arrangement as claimed in claim 7, wherein the radius (R1) varies in the range from 2 mm to 100 mm.

9. The valve arrangement as claimed in claim 4, wherein, in the second cross-sectional plane (E2) and/or the third cross-sectional plane (E3), the outer contour (371) has two straight sections (372, 373; 374, 375) in the height direction (314) and a transition section (376) situated therebetween, wherein the transition section (376) is situated opposite the valve body (110) in the closed position.

10. The valve arrangement as claimed in claim 9, wherein the straight sections (372, 373) are formed to be substantially parallel to one another; or wherein the straight sections (374, 375) run obliquely toward one another in the direction of the transition section (376).

11. The valve arrangement as claimed in claim 10, wherein when the straight sections (372, 373) are formed to be substantially parallel to one another, the straight sections (372, 373) run in the height direction (314).

12. The valve arrangement as claimed in claim 9, wherein the transition section (376) has first and second rounded transition regions (376a, 376b) and a straight bridge section (376c) situated therebetween.

13. The valve arrangement as claimed in claim 4, wherein, in the second cross-sectional plane (E2) and/or the third cross-sectional plane (E3), the outer contour has at least one undercut (378).

14. The valve arrangement as claimed in claim 4, wherein an extent of the wall region (370) in the height direction (314) directly below the base section (116) of the valve body (110), viewed in the closed position, lies in the range from 1 mm to 30 mm; or wherein an extent of the wall region (370) in the height direction (314) directly below the base section (116) of the valve body (110), viewed in the closed position, approaches zero.

15. The valve arrangement as claimed in claim 14, wherein an extent of the wall region (370) in the height direction (314) directly below the base section (116) of the valve body (110), viewed in the closed position, lies in the range from 5 mm to 25 mm.

16. The valve arrangement as claimed in claim 1, wherein the valve body (110) is designed to close off, in the closed position, both the bypass opening (350) and the connecting region (360).

17. A multi-channel turbine (10) for a supercharging device, comprising:
a turbine wheel (20); and
a turbine housing (30);
characterized by a valve arrangement (100) as claimed in claim 1, wherein the housing section (300) is formed as part of the turbine housing (30).

18. A supercharging device for an internal combustion engine, comprising:
a compressor (40) and a multi-channel turbine (10) as claimed in claim 17, wherein the multi-channel turbine (10) is coupled rotatably to the compressor (40).

* * * * *